United States Patent
Hubbert et al.

(10) Patent No.: US 6,732,894 B2
(45) Date of Patent: May 11, 2004

(54) VEHICLE CUP HOLDER ARM ASSEMBLY

(75) Inventors: Timothy R. Hubbert, Novi, MI (US); Joseph J. Davis, Jr., Ortonville, MI (US); Michael J. Hier, Royal Oak, MI (US); Jack S. Palazzolo, Dearborn, MI (US); Dean Corrion, Grosse Pointe Park, MI (US)

(73) Assignee: Lear Corporation, Southfield, MI (US)

( * ) Notice: Subject to any disclaimer, the term of this patent is extended or adjusted under 35 U.S.C. 154(b) by 92 days.

(21) Appl. No.: 10/137,998

(22) Filed: May 3, 2002

(65) Prior Publication Data

US 2002/0153399 A1 Oct. 24, 2002

Related U.S. Application Data

(63) Continuation-in-part of application No. 09/733,278, filed on Dec. 8, 2000, now Pat. No. 6,468,457.
(60) Provisional application No. 60/170,937, filed on Dec. 15, 1999.

(51) Int. Cl.⁷ .................................................. A47K 1/08
(52) U.S. Cl. ...................... 224/539; 224/926; 296/37.8; 248/311.2
(58) Field of Search ................................. 224/926, 482, 224/483, 282, 539, 552, 553, 275; 248/311.2; 296/37.8

(56) References Cited

U.S. PATENT DOCUMENTS

| | | | |
|---|---|---|---|
| 2,800,360 A | 6/1957 | Jenkins | |
| 3,000,049 A | 9/1961 | Terry, Jr. | |
| 3,591,669 A | 7/1971 | Memory | |
| 4,485,064 A | 11/1984 | Laurin | |
| 4,702,156 A | 10/1987 | Sano | |
| 4,783,037 A | * 11/1988 | Flowerday | ............... 248/311.2 |
| 4,890,356 A | 1/1990 | Czech et al. | |
| 5,060,899 A | * 10/1991 | Lorence et al. | ............. 224/926 |
| 5,072,989 A | * 12/1991 | Spykerman et al. | ... 297/188.16 |
| 5,165,002 A | 11/1992 | Cumberledge et al. | |
| 5,167,392 A | 12/1992 | Henricksen | |
| 5,259,580 A | * 11/1993 | Anderson et al. | ........... 224/926 |
| 5,289,962 A | 3/1994 | Tull et al. | |
| 5,333,023 A | 7/1994 | Oxford | |
| 5,598,999 A | 2/1997 | Plocher et al. | |
| 5,800,011 A | * 9/1998 | Spykerman | .............. 248/311.2 |
| 5,826,311 A | 10/1998 | Henricksen | |
| 5,842,671 A | * 12/1998 | Gibbs | ....................... 248/311.2 |
| 5,860,630 A | * 1/1999 | Wildey et al. | .............. 224/926 |
| 5,921,519 A | * 7/1999 | Dexter et al. | ............... 224/926 |
| 5,944,240 A | 8/1999 | Honma | |
| 5,950,017 A | 9/1999 | Reff | |
| 6,290,701 B1 | 9/2001 | Enayati | |
| 6,302,364 B1 | 10/2001 | Chiueh | |

FOREIGN PATENT DOCUMENTS

EP 0761984 A1 12/1997

OTHER PUBLICATIONS

International Search Report, Mar. 30, 2001.

* cited by examiner

Primary Examiner—Nathan J. Newhouse
(74) Attorney, Agent, or Firm—Bill C. Panagos

(57) ABSTRACT

A vehicle cup holder assembly comprising a vehicle component including a cup holder opening therein and an aperture formed adjacent the cup holder opening. A base injection molded from a first material and including an attachment feature which extends into the aperture and is selectively movable between extended and collapsed positions with respect to the aperture. An arm cup injection molded from a second material at least partially around the base and including an arm, wherein the second material is overmolded onto the base but not chemically bonded to the first material so that the arm cup and arm are rotatable with respect to the base for adjustably securing a cup in the cup holder opening.

18 Claims, 9 Drawing Sheets

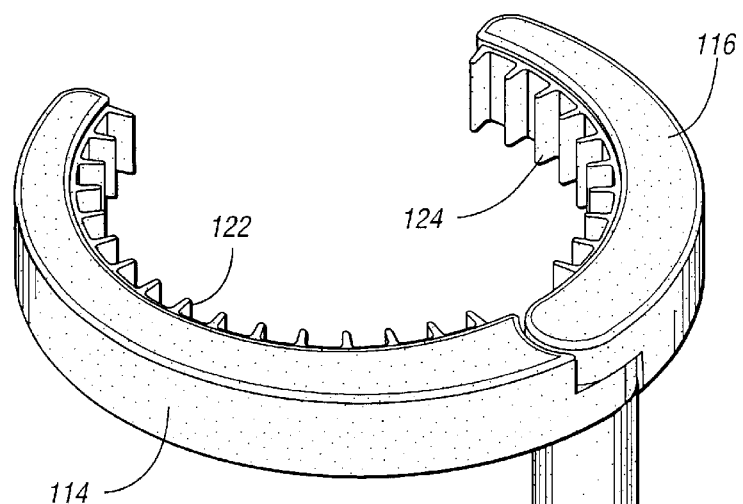
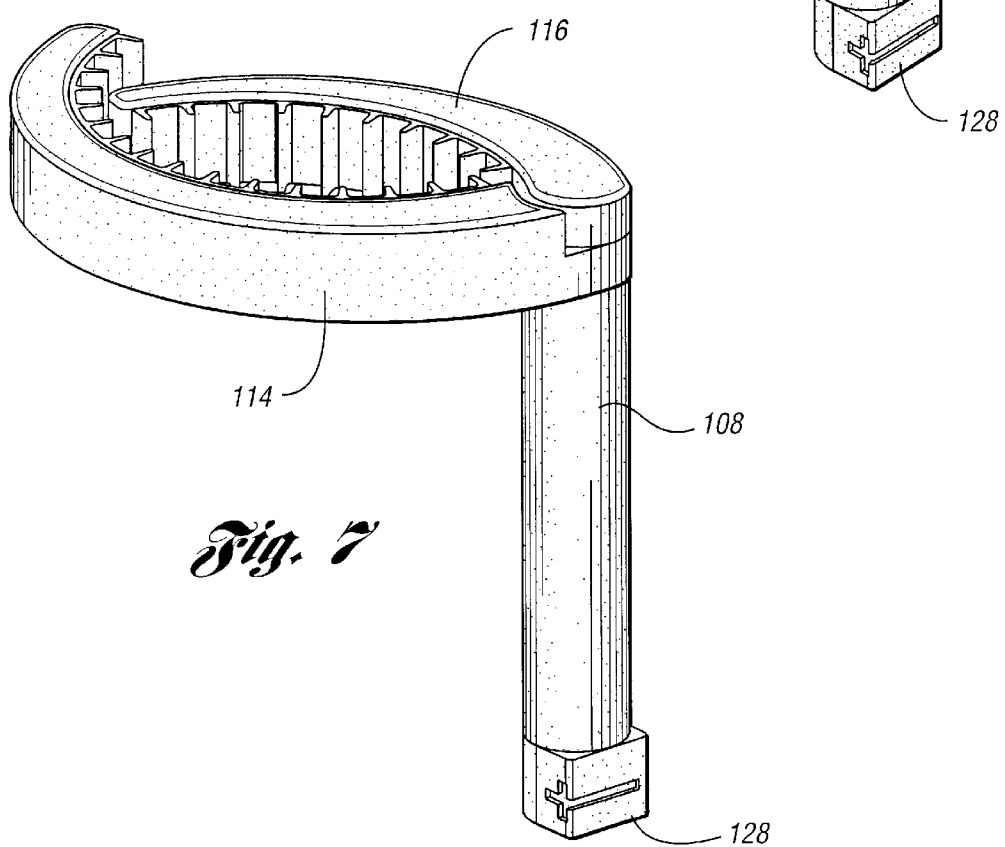
Fig. 6
Fig. 7

VEHICLE CUP HOLDER ARM ASSEMBLY

CROSS-REFERENCE TO RELATED APPLICATIONS

This application is a continuation-in-part of U.S. application Ser. No. 09/733,278, filed Dec. 8, 2000, now U.S. Pat. No. 6,468,457 which claims the benefit of U.S. provisional application Ser. No. 60/170,937, filed Dec. 15, 1999.

BACKGROUND OF THE INVENTION

1. Field of the Invention

The present invention relates to a vehicle cup holder arm assembly.

2. Background Art

Vehicle cup holder assemblies are popular in modern vehicle designs. Countless variations of cup holder assemblies exist, each variation having varying degrees of efficiency, practicality, manufacturability and cost.

Vehicle interior designers have continuously modified cup holder designs to improve aesthetics of the design and to improve functionality as cost constraints continue to tighten. The ideal design would be inexpensive to manufacture, simple to assemble, be aesthetically pleasing, and provide improved functionality such that it could securely hold a variety of shapes and sizes of cups.

Accordingly, it is desirable to provide an improved vehicle cup holder assembly and method of manufacturing the same which achieves these stated goals while reducing cost of manufacturing and assembly.

SUMMARY OF THE INVENTION

One aspect of the invention provides a vehicle cup holder assembly with many of the above features, and also including a pop-up feature for vertically adjusting the position of the cup holder arm for differently-sized cups. The arm is movable between collapsed and extended positions, and pivotally adjustable in each position for securing a cup.

More specifically, the above stated aspect of the invention provides a vehicle cup holder assembly including a vehicle component, such as a console, having a cup holder opening therein and an aperture formed adjacent the cup holder opening. A base is injection molded from a first material and includes an attachment feature configured to extend into the aperture and is selectively movable between extended and collapsed positions with respect to the aperture. An arm cup is injection molded from a second material at least partially around the base and includes an arm. The second material is not chemically bonded to the first material so that the arm cup and arm are rotatable with respect to the base for adjustably securing a cup in the cup holder opening. Preferably, a friction fit is provided between the arm cup and base, such as slidably engaged teeth. A second arm is also included and non-rotatably mounted to the base. A third material may be molded onto the arm to form a rubber grip.

According to another embodiment of the present invention, the vehicle cup holder comprises a rotating gear attached to the vehicle component and located adjacent the aperture. A plurality of teeth are disposed on the base to engage the rotating teeth.

According to another embodiment of the present invention, the rotating gear comprises viscous fluid to dampen the movement of the base.

According to yet another embodiment of the present invention, the vehicle component further comprises a bracket disposed under the aperture. The base further has a hollow portion. The vehicle cup holder further comprises a spring having two ends, one end disposed in the hollow portion of the base and the second end disposed on the bracket. The spring urges the base upwardly from the collapsed position to the extended position.

According to yet another embodiment of the present invention, the vehicle cup holder further comprises a mechanical stop on the bracket and an axial slot on the base, the axial slot having an upper end. The mechanical stop contacts the upper end of the axial slot to limit upwardly travel of the base.

According to yet another embodiment of the present invention, the vehicle cup holder further comprises a pin attached to the base and extending into the bracket. The bracket further comprising a stopping block having a recess wherein the pin is selectively restrained within the recess to prevent upward travel of the base.

According to yet another embodiment of the present invention, the bracket further comprises an escape channel proximate the stopping block and a escape ramp below the recess so that when the base is pushed down, the pin contacts the escape ramp causing the pin to move into the escape channel thereby permitting upwardly movement of the pin and the base.

In another embodiment of the present invention, the bracket further comprises a positioning ramp below at least a portion of the stopping block so that when the base is pressed down from the extended position, the pin contacts the positioning ramp causing the pin to rotate such that when the base is urged upwardly by the spring, the pin is restrained in the recess.

According to another aspect of the invention, the invention provides a cup holder arm assembly comprising a base injection molded from a first material and including an attachment feature adapted for engagement within an aperture adjacent a cup holder opening in a vehicle. The invention also provides an arm cup and arm injection molded from a second material onto the base, with an arm cup overmolded around the base. The second material is not chemically bonded to the first material so that the arm cup and arm are rotatable with respect to the base. A third material is injection molded onto the arm to form a soft rubber grip for engaging a cup.

According to yet another aspect of the present invention, the invention provides a vehicle cup holder assembly comprising a vehicle component including a cup holder opening therein and an aperture formed adjacent the cup holder opening. A base including a hollow portion and an attachment feature which extends into the aperture and is selectively movable between extended and collapsed positions with respect to the aperture is also provided. The invention also provides an arm cup including an arm and a bracket disposed under the aperture formed adjacent the cup holder. A spring is provided having first and second ends, one end disposed in the hollow portion of the base and the second end disposed on the bracket such that the spring urges the base upwardly from a collapsed position to an extended position.

According to yet another embodiment of the present invention, the vehicle cup holder further comprises a pin attached to the base and extending into the bracket. The bracket further comprising a stopping block having a recess wherein the pin is selectively restrained within the recess to prevent upward travel of the base.

According to yet another embodiment of the present invention, the bracket further comprises an escape channel proximate the stopping block and a escape ramp below the recess so that when the base is pushed down, the pin contacts the escape ramp causing the pin to move into the escape channel thereby permitting upwardly movement of the pin and the base.

In another embodiment of the present invention, the bracket further comprises a positioning ramp below at least a portion of the stopping block so that when the base is pressed down from the extended position, the pin contacts the positioning ramp causing the pin to rotate such that when the base is urged upwardly by the spring, the pin is restrained in the recess.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 6 shows a perspective view of the cup holder arm assembly of FIG. 4 with the arm in the open position;

FIG. 7 shows a perspective view of the cup holder arm assembly of FIG. 4 with the arm in the closed position;

DETAILED DESCRIPTION OF THE PREFERRED EMBODIMENTS

Figure 1:
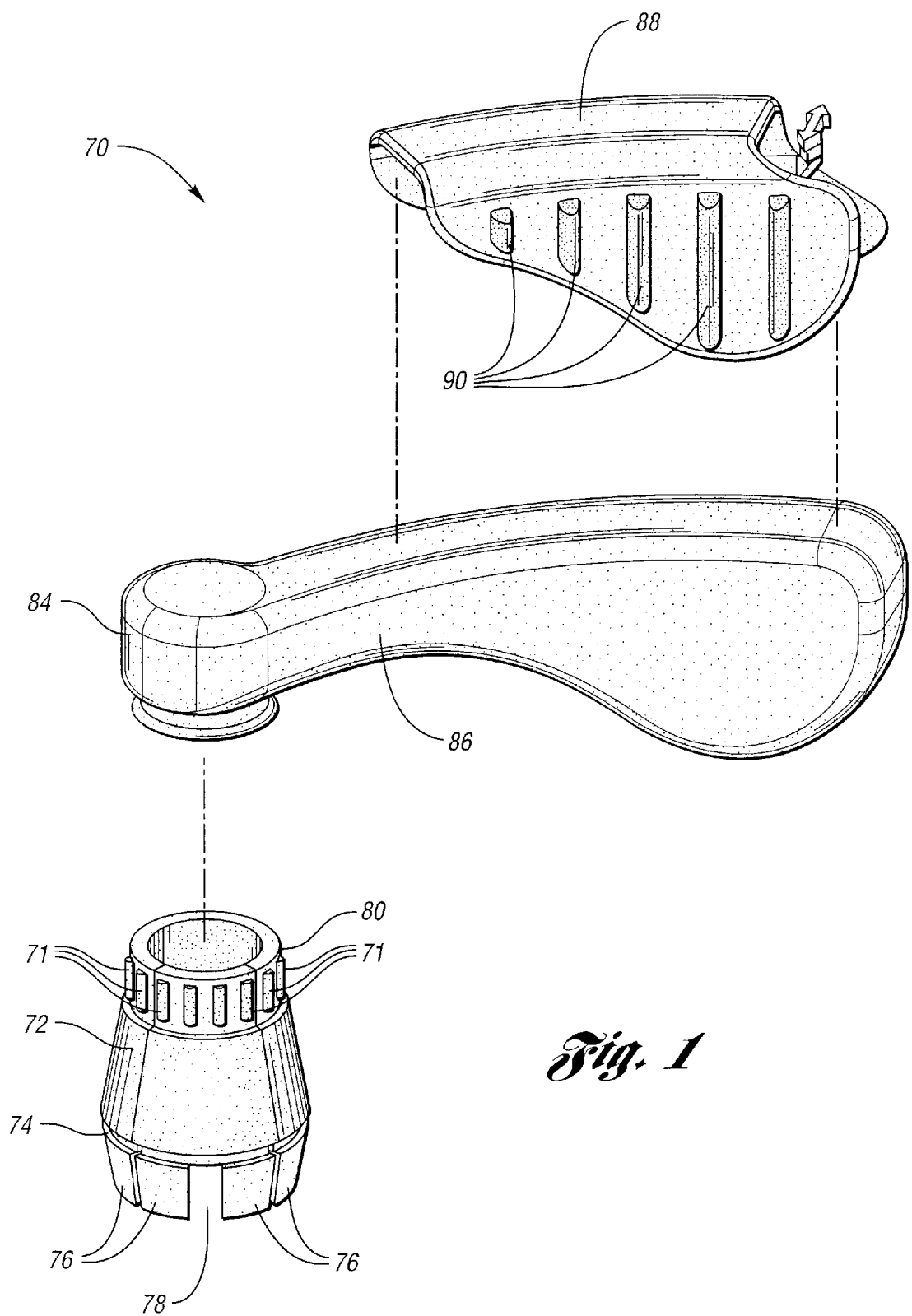
FIG. 1 shows an exploded perspective view of a cup holder arm assembly in accordance with the invention.
Figure 2:
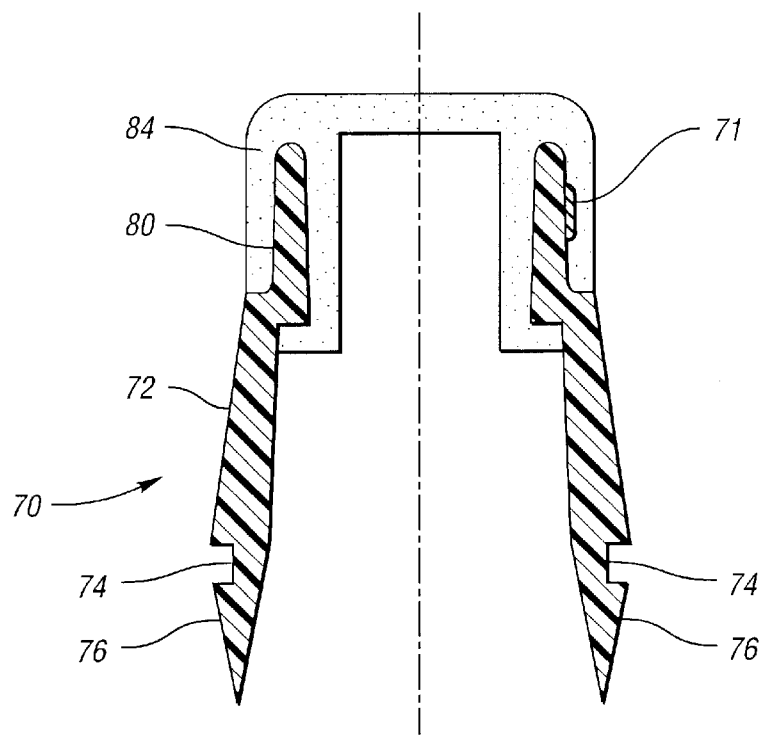
FIG. 2 shows a vertical cross-sectional view of the base and arm cup of FIG. 1.
Figure 3:
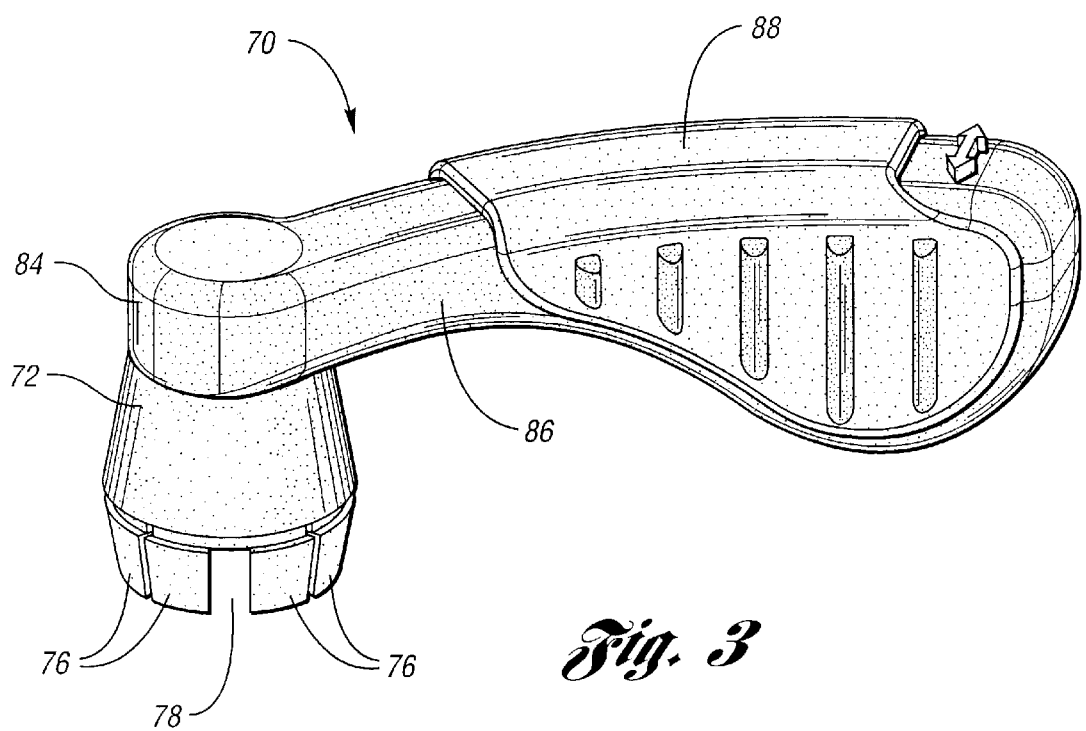
FIG. 3 shows a perspective assembled view of the cup holder arm assembly of FIG. 1.

Referring to FIGS. 1–3, a cup holder arm assembly 70 is shown in accordance with a first embodiment of the invention. The cup holder 70 is manufactured by a three-shot molding process. The first step of the process is to injection mold the base 72 of a polypropylene material. The base 72 includes a circumferential groove 74 and a plurality of snap tabs 76 adapted for a snap-fit engagement within an aperture formed in a vehicle console adjacent a cup holder opening, such as that described later with respect to FIGS. 4 and 5. A recess 78 is formed between the snap tabs 76 for locking engagement with a corresponding tooth in the console aperture. In this manner, the base 72 is rigidly attached to a vehicle console adjacent a cup holder opening.

Prior to beginning the second shot of injection molding, a hot runner in the injection molding tool is used to carry soft molded rubber to the peripheral edge 80 of the base 72 to form rubber serrations 71 around the peripheral edge 80, as shown in FIGS. 1 and 2. These rubber serrations may be vertical or horizontal, and the thickness and frequency may vary depending upon the application. This soft rubber material is the same as that used in the third injection molding shot, to be described below.

After the serrations 71 have been molded onto the peripheral edge 80, while the base 72 is positioned within a mold, the arm cup 84 is overmolded onto the base 72 in the second shot of the three-shot molding process. The arm cup 84 is preferably an ABS (acrylonitrile butadiene styrene) material, or other material which will not chemically bond to the base 72. In this manner, the arm cup 84 may be overmolded around the peripheral edge 80 so that, in the final molded product, the arm cup 84 is rotatable with respect to the base 72 to allow infinite pivotal adjustment of the arm cup 84 with respect to the base 72, with the rubber serrations 71 on the peripheral edge 80 providing sufficient frictional engagement with the arm cup 84 to hold the arm 86 in a selected position when desired.

Finally, a third shot of material is overmolded onto the arm 86 to form the soft rubber grip 88 for engaging a cup. The grip 88 includes ribs 90 on the surface thereof for engaging the cup. The third shot is preferably a soft rubber material, such as neoprene.

The three-shot molding process may be accomplished by rotating in separate mold halves to form the second and third shots 84,88, such as in a rotational molding process. Alternatively, three molds could be used sequentially to form the different components, wherein the base would be molded in a first mold, and moved to a second mold where the arm cup and arm are added, and the rubber grip is molded onto the arm in a third mold.

This cup holder assembly is advantageous over prior art designs because the three-shot overloading process eliminates manual assembly, which improves quality, and it eliminates the multiple components of a typical cup holder arm assembly which may include springs, cams, dampers, etc. The swing arm efforts can be tuned to any customer requirement, and the assembly could be styled to meet the needs of any interior.

Figure 4:
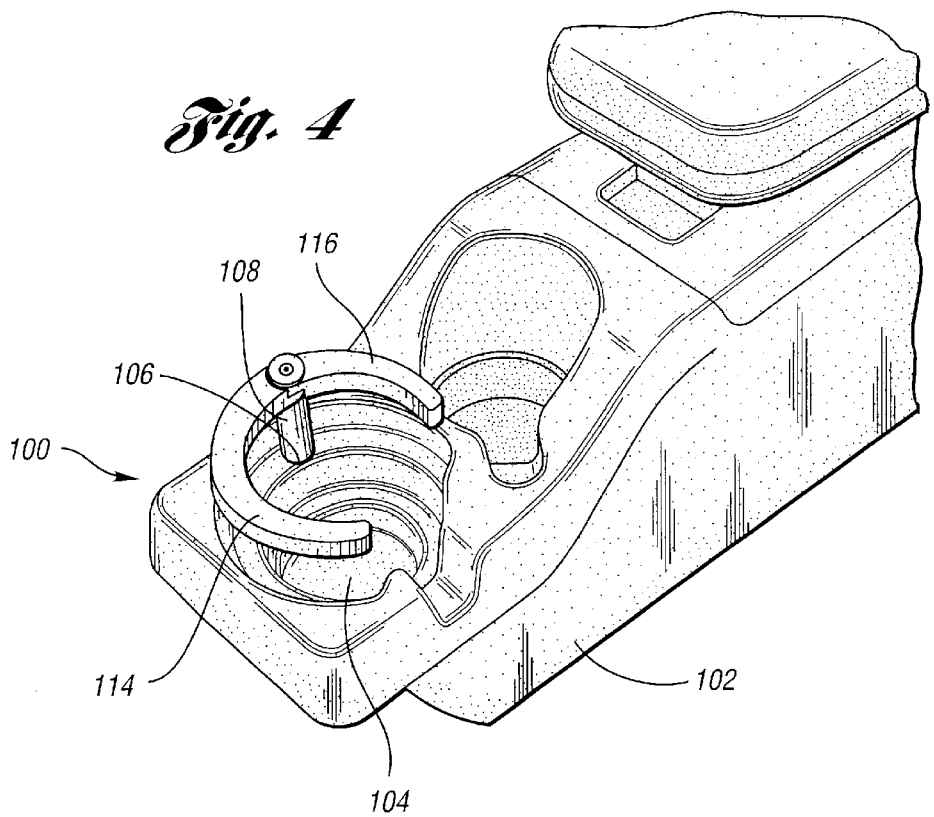
FIG. 4 shows a perspective view of a cup holder assembly in accordance with an alternative embodiment of the invention, with the cup holder arm in the extended position.
Figure 5:
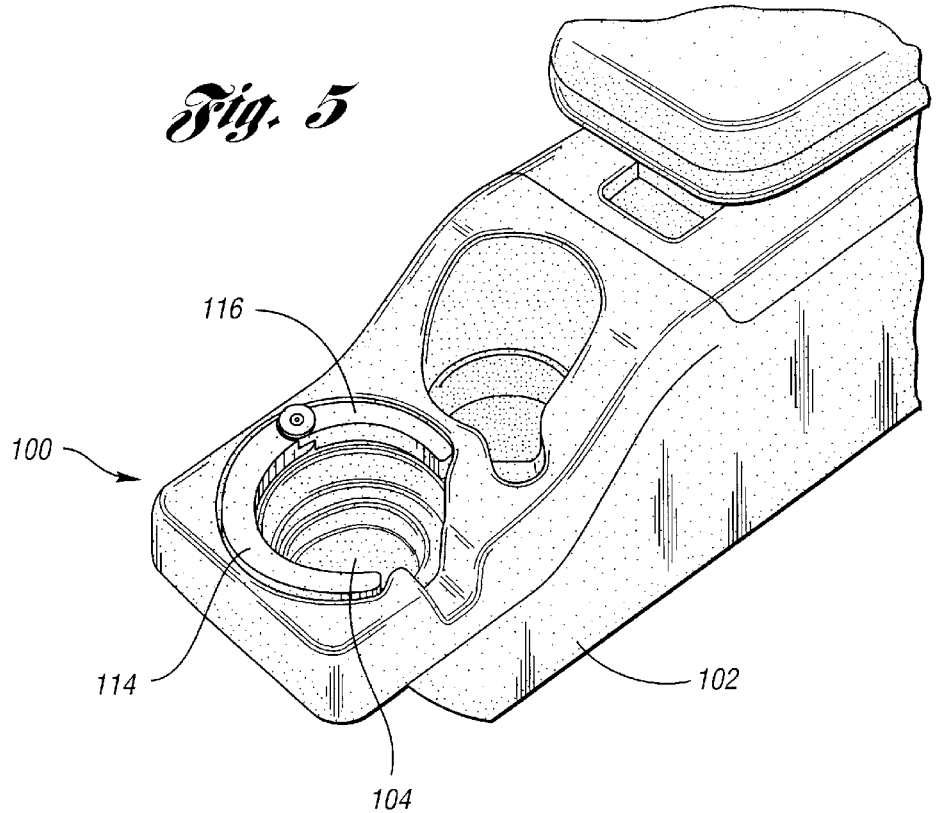
FIG. 5 shows a perspective view of the cup holder assembly of FIG. 4, with the cup holder arm in the collapsed position.
Figure 8:
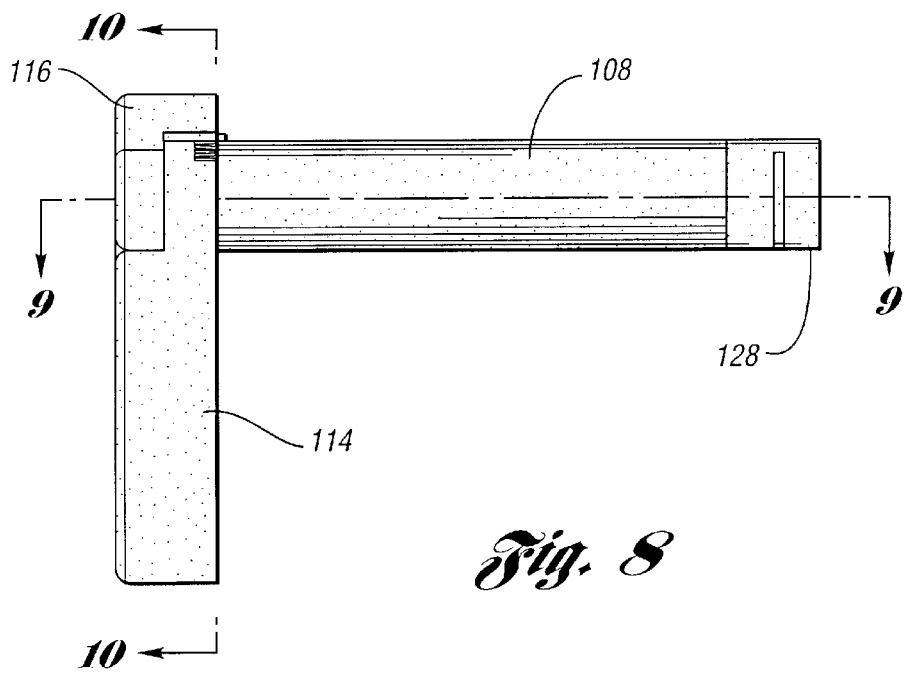
FIG. 8 shows a side view of the cup holder arm assembly of FIG. 7.
Figure 9:
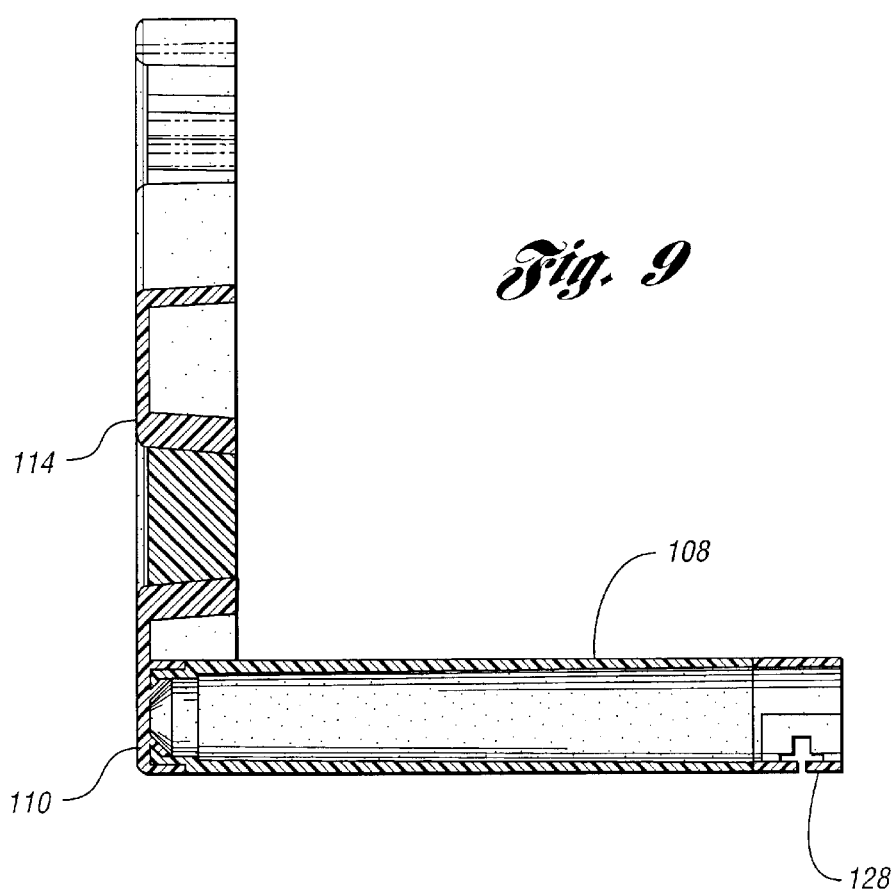
FIG. 9 shows a cross-sectional view taken at line 9—9 of FIG. 8.
Figure 10:
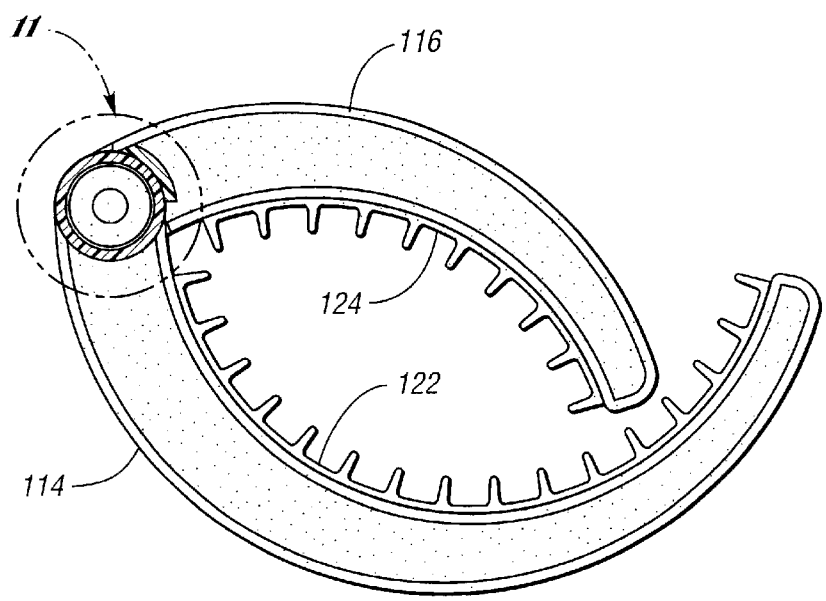
FIG. 10 shows a sectional view taken at line 10—10 of FIG. 8.

Turning to FIGS. 4–13, a second embodiment of the invention is shown. As shown in FIGS. 4 and 5, a vehicle cup holder assembly 100 includes a vehicle component, such as a console 102 including a cup holder opening 104 therein and an aperture 106 formed adjacent the cup holder opening 104.

A base 108 is injection molded from a first material and includes an attachment feature which extends into the aperture 106. In this instance, the attachment feature is the configuration of the base 108 which slidably fits within the aperture 106 for attachment to the console 102. The base 108 is selectively movable between an extended position shown in FIG. 4 and a collapsed position shown in FIG. 5.

As shown more clearly in the following figures, an arm cup 110 is injection molded from a second material, such as polypropylene, around the top portion 112 of the base 108. The second material is not chemically bonded to the first material, which is preferably nylon, so that the arm cup 110 and arm 114 are rotatable with respect to the base 108 for adjustably securing a cup in the cup holder opening 104.

Figure 13:
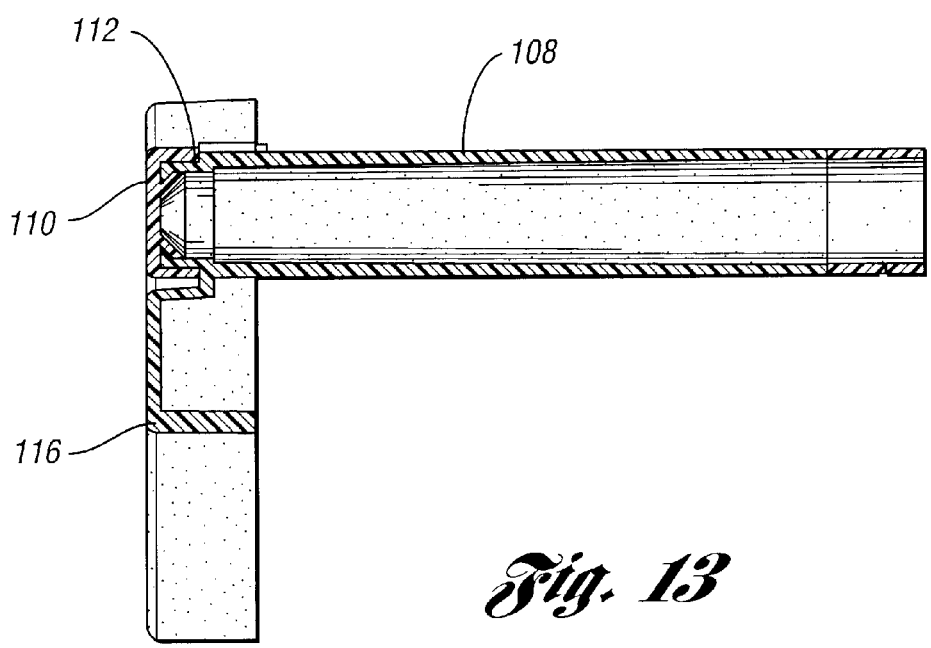
FIG. 13 shows a sectional view taken at line 13—13 of FIG. 12.

As shown in FIG. 13, a second, stationary arm 116 is integrally molded with the base 108 so that the movable arm 114 may press a cup against the stationary arm 116 for holding the cup in position.

Figure 11:
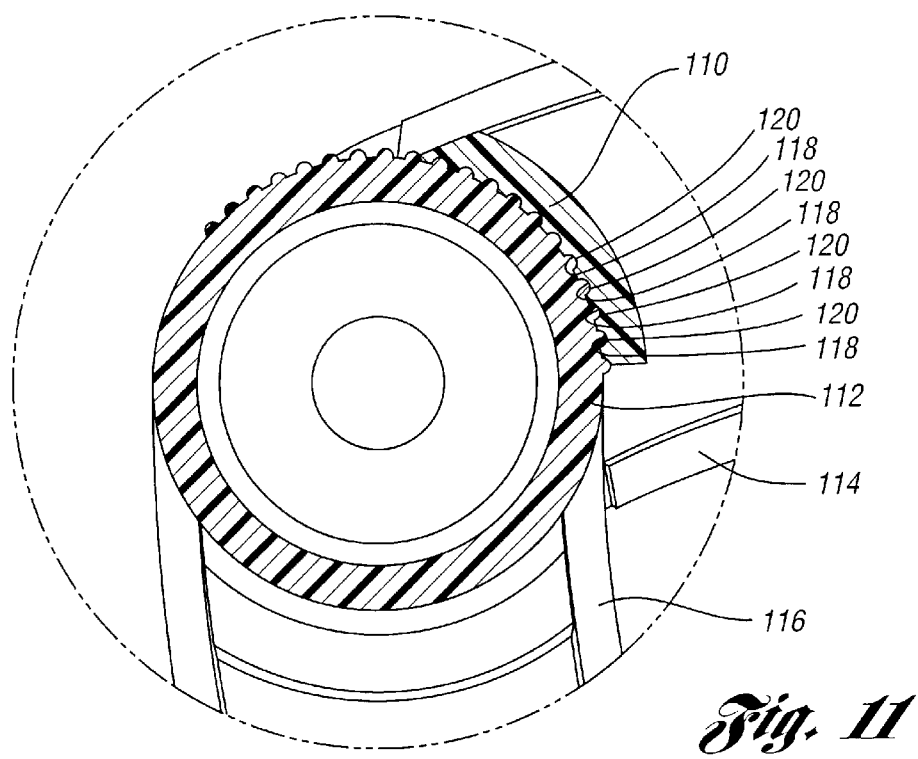
FIG. 11 shows an enlarged partial sectional view taken at detail 11—11 of FIG. 10.
Figure 12:
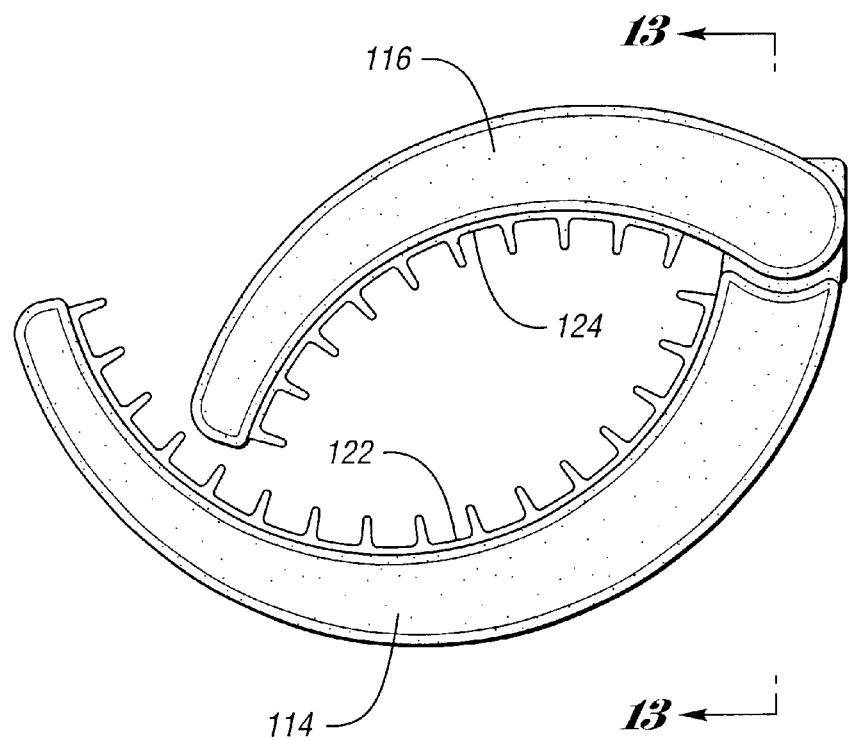
FIG. 12 shows a top plan view of the cup holder arm assembly of FIG. 7.

As mentioned above, the first and second materials of the base 108 and arm cup 110, respectively, do not chemically bond with each other to allow respective pivotal movement. However, a friction fit or interference fit is provided between the arm cup 110 and the top portion 112 of the base 108. As shown in FIG. 11, which is a detailed view taken from detail 11—11 of FIG. 10, the base top portion 112 is provided with a plurality of integral teeth 118 extending therefrom which are engageable, respectively, with the slots 120 formed in the arm cup 110. The arm 114 provides a sufficiently long moment arm to enable respective pivotal adjustment by sliding the teeth 118 across the slots 120 with minimal effort. The engagement of the teeth 118 in the slots 120 provides sufficient frictional or locking engagement to secure a cup in position when the arm 114 is adjusted with respect to the second arm 116.

A third, rubber material is injection molded onto the arms 114,116 to form rubber grips 122,124 thereon, respectively. The third material is preferably a soft rubber, such as neoprene or Santoprene®, a thermoplastic elastomer available from Advanced Elastomer Systems.

In order to provide the pop-up feature in the cup holder assembly 100 for movement between the positions shown in FIGS. 4 and 5, the bottom portion 128 of the base 108 may be engaged with a spring damper for selective deployment between the collapsed and extended positions. The device may also be of the "push-push" type so that the user may simply press the base 108 downward to cause disengagement and movement to the deployed position from the collapsed position (i.e., pop-up movement), and may again press the base 108 downward for movement from the extended position to the collapsed position. These features will be discussed in detail.

The movable cup holder arm 114 is pivotally movable whether the base 108 is in the collapsed or extended position so that the cup holder assembly 100 may support differently-sized cups in the different positions.

Figure 14:
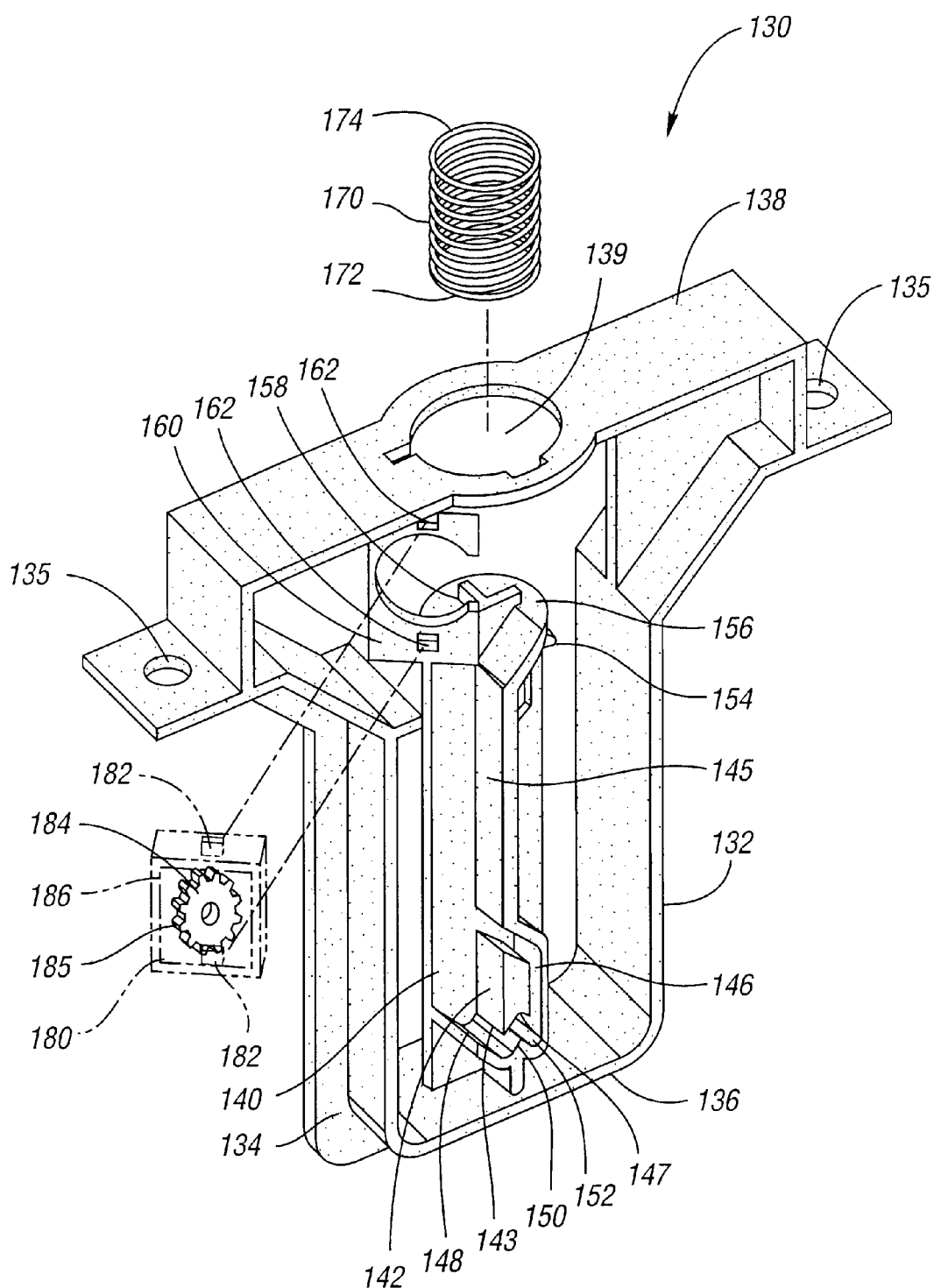
FIG. 14 is a perspective view of the bracket of the present invention.
Figure 15:
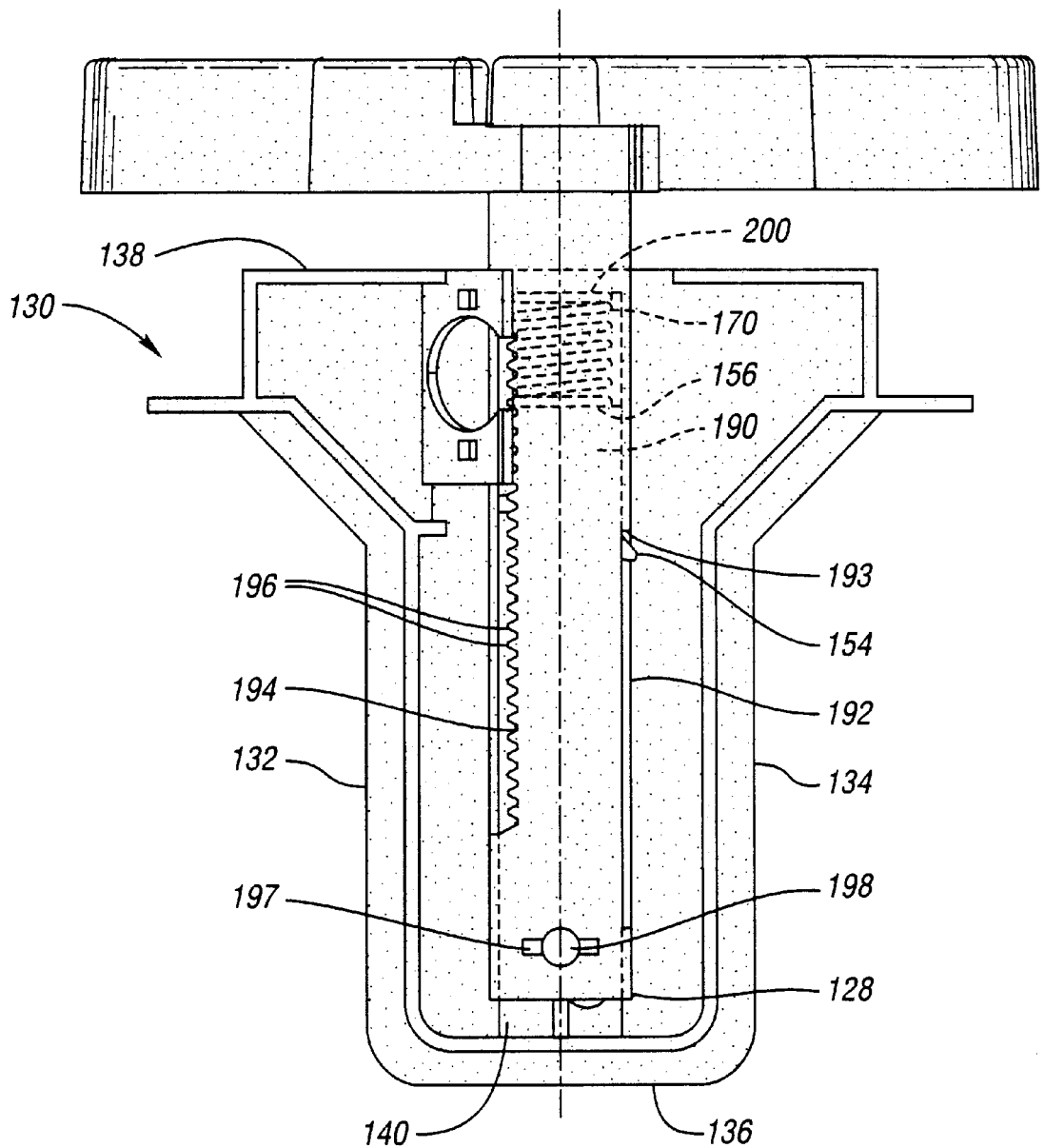
FIG. 15 shows a side view of the bracket of the present invention.

Referring now to FIGS. 14 and 15, a generally U-shaped bracket 130 may be attached to the bottom surface (not shown) of console 102 underneath aperture 106. The bracket 130 may be integrally molded to the console 102. Preferably, it is attached to the console 102 in a subsequent operation using known methods such as welding, adhesives, or fasteners through fastener apertures 135. The bracket 130 preferably is made out of acrylonitrile-butadiene-styrene (ABS) but may be made out of metal, other plastic material, or other suitable material.

The bracket 130 comprises sides 132 134, a bracket base 136, and a bracket top 138. The bracket top has a bracket aperture 139 located under the aperture 106 to allow the base 108 to extend therethrough. The bracket base 136 is located directly underneath the bracket aperture 138. A column 140 extends upwardly from the bracket base 136. The column 140 comprises a stopping block 142 having a recess 147 and a positioning point 143. An escape channel 146 is provided adjacent the stopping block which leads to a vertical surface 145. The column 140 further has a positioning ramp 148, a capture ramp 150, and an escape ramp 152. A mechanical stop 154 is also preferably provided on the column 140. The top of the column 140 has a spring surface 156 that preferably has a plurality of ribs 158 to maintain a compression spring 170 in position. The spring 170 has a bracket end 172 and a base end 174. The spring 170 may be made out of a polymer or metal.

The column 140 may also include a gear retainer plate 160 having a plurality of gear plate apertures 162 for retaining a gear box 180. The gear box 180 has a plurality of tangs 182 to snap fit into the gear plate apertures 162 to retain the gear box. One skilled in the art could devise alternative methods of securing the gear box to the bracket 130 such as fasteners, welding, or adhesives. The gear box 180 contains a rotary gear 184 having a plurality of teeth 185. Preferably, the gear box 180 contains viscous fluid 186 to dampen the rotation of the rotary gear 184.

The base 108 preferably has a hollow portion 190 open to its bottom end 128. An axial slot 192 having a top end 193 is provided along the base 108 designed to accommodate the mechanical stop 154 to limit vertical movement of the base. The base 108 also preferably has an axial gear portion 194 along the base having gear teeth 196 sized to correspond to the rotary gear 184. A pin slot 197 is provided in the bottom portion 128 of the base to receive a pin 198. A spring plate 200 is provided on the inside of the base 108 at the end of the hollow portion 190.

One possible method of assembling the vehicle cup holder assembly 100 of the present invention is to first secure the gear box 180 to the bracket 130 using for example the tangs 182. The bracket 130 is then attached to the bottom surface of the console 102 using, for example, fasteners. The spring 170 is then placed on top of the spring surface 156 of the column 140. The base 108 and arm 114, 116 assemble is then inserted through aperture 106 and bracket aperture 139 so that the spring 170 is in the hollow portion 190. The base 108 is pressed down compressing spring 170 and a pin 198 is inserted into the pin slot 197 to secure the base 108 to the bracket 130.

In operation, the base is initially in a storage position as shown in FIG. 5. The pin 198 is in the recess 147 of the stopping block 142 thereby restraining the base in position. To cause the base 108 to extend to its extended position as shown in FIG. 4, the base is pressed down so that the pin 198 contacts the escape ramp 152 causing the base to rotate until the pin is in the escape channel 146. The pin 198 is no longer constrained by the stopping block 142 or recess 147 so that when the base 108 is released, the base will be urged upwards along the vertical surface 145 by the spring 170 until the mechanical stop 154 contacts the top end 193 of the axial slot 192 thereby limiting the travel of the base. When the pin 198 leaves the escape channel 146, the base 108 rotates back to its original position. Preferably, the gear box 180 having a rotary gear 184 and viscous fluid 186 dampens the travel of the base 108 to provide a controlled ascent and descent.

To store the base 108, sufficient force is applied to the base 108 to overcome the force of the spring 170. The pin 198 travels down along vertical surface 145 and the stopping block 142 until it contacts the positioning ramp 148. The positioning ramp 148 causes the pin 198 to rotate so that the pin rotates past the positioning point 143. When the base 108 is released, the pin is urged upwards by the spring 170 and into the recess 147 which constrains the base.

Other embodiments of the present invention are possible. For example, it is possible to have a vehicle cup holder assembly having a bracket 130 with all the associated features that does not have a base and an arm cup manufactured out of two different materials. Further, it is possible to have a vehicle cup holder assembly that does not have a rotary gear to dampen the base. Additionally, other methods of restraining the base are possible.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle cup holder assembly comprising:
    a vehicle component including a cup holder opening therein and an aperture formed adjacent the cup holder opening and extending through a top surface of the vehicle component;
    a base molded from a first material and including an attachment feature which extends into the aperture and is selectively movable between extended and collapsed positions with respect to the aperture, the base including teeth disposed around a peripheral edge at an end opposite the attachment feature; and
    an arm cup molded from a second material at least partially around the base and including an arm, the arm cup slidably engaging the teeth, wherein the second material is molded around a peripheral edge of the base but not chemically bonded to the first material so that the arm cup and arm are rotatable with respect to the base for adjustably securing a cup in the cup holder opening.

2. The vehicle cup holder assembly of claim 1, wherein the arm cup and base include a friction fit therebetween.

3. The vehicle cup holder assembly of claim 1, further comprising a second arm non-rotatably mounted to the base.

4. The vehicle cup holder assembly of claim 1, further comprising a third material molded to the arm to form a rubber grip for engaging the cup.

5. The vehicle cup holder assembly of claim 1 further comprising:
    a rotating gear attached to the vehicle component and located adjacent the aperture; and
    a plurality of teeth disposed on the base to engage the rotating gear.

6. The vehicle cup holder assembly of claim 5 wherein the rotating gear comprises viscous fluid to dampen the movement of the base.

7. The vehicle cup holder of claim 5 wherein the vehicle component further comprises a bracket and wherein the rotating gear is attached to the bracket.

8. The vehicle cup holder of claim 1 wherein the vehicle component further comprises a bracket disposed under the aperture formed adjacent the cup holder and wherein the base has a hollow portion, and the vehicle cup holder further comprises a spring having first and second ends, one end disposed in the hollow portion of the base and the second end disposed on the bracket such that the spring urges the base upwardly from the collapsed position to the extended position.

9. The vehicle cup holder of claim 8 further comprising a mechanical stop on the bracket and an axial slot having on the base, the axial slot having an upper end
    wherein the mechanical stop contacts the upper end of the axial slot to limit upwardly travel of the base.

10. The vehicle cup holder of claim 8 further comprising a pin attached to the base and extending into the bracket, the bracket further comprising a stopping block having a recess wherein the pin is selectively restrained within the recess to prevent upward travel of the base.

11. The vehicle cup holder of claim 8 wherein the bracket further comprises an escape channel proximate the stopping block and a escape ramp below the recess so that the base is pushed down, the pin contacts the escape ramp causing the pin to move into the escape channel thereby permitting upwardly movement of the pin and the base.

12. The vehicle cup holder of claim 10 wherein the bracket further comprises a positioning ramp below at least a portion of the stopping block so that when the base is pressed down from the extended position, the pin contacts the positioning ramp causing the pin to rotate such that when the base is urged upwardly by the spring, the pin is restrained in the recess.

13. A cup holder arm assembly comprising:
    a base molded from a first material and including an attachment feature having a plurality of snap tabs adapted for engagement within an aperture adjacent a cup holder opening in a vehicle;
    an arm cup and arm molded from a second material onto the base, with the arm cup molded around a peripheral edge of the base, wherein the second material is not chemically bonded to the first material so that the arm cup and arm are rotatable with respect to the base for securing a cup in the cup holder opening; and
    a third material molded onto the arm to form a soft rubber grip for engaging a cup.

14. The cup holder arm assembly of claim 13, further comprising a plurality of rubber bumps on the base, the rubber bumps being operative to provide sufficient frictional engagement with the arm cup to hold the arm in a selected position after the arm is adjusted.

15. A vehicle cup holder assembly comprising:
    a vehicle component including a cup holder opening therein and an aperture formed adjacent the cup holder opening;
    a base including a hollow portion and an attachment feature which extends into the aperture and is selectively movable between extended and collapsed positions with respect to the aperture, the base including teeth disposed around a peripheral edge at an end opposite the attachment feature;
    an arm cup including an arm, the arm cup slidably engaging the teeth;
    a bracket disposed under the aperture formed adjacent the cup holder;
    a spring having first and second ends, one end disposed in the hollow portion of the base and the second end disposed on the bracket such that the spring urges the base upwardly from the collapsed position to the extended position.

16. The vehicle cup holder of claim 15 further comprising a pin attached to the base and extending into the bracket, the bracket further comprising a stopping block having a recess wherein the pin is selectively restrained within the recess to prevent upward travel of the base.

17. The vehicle cup holder of claim 16 wherein the bracket further comprises an escape channel proximate the stopping block and a escape ramp below the recess so that the base is pushed down, the pin contacts the escape ramp causing the pin to move into the escape channel thereby permitting upwardly movement of the pin and the base.

18. The vehicle cup holder of claim 16 wherein the bracket further comprises a positioning ramp below at least a portion of the stopping block so that when the base is pressed down from the extended position, the pin contacts the positioning ramp causing the pin to rotate such that when the base is urged upwardly by the spring, the pin is restrained in the recess.

* * * * *